United States Patent
Kubendran (10) Patent No.: US 11,145,042 B2
(45) Date of Patent: Oct. 12, 2021

(54) USING CONVOLUTIONAL NEURAL NETWORK STYLE TRANSFER TO AUTOMATE GRAPHIC DESIGN CREATION

(71) Applicant: Palo Alto Research Center Incorporated, Palo Alto, CA (US)

(72) Inventor: Kalaivani Ramea Kubendran, Union City, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 149 days.

(21) Appl. No.: 16/681,198

(22) Filed: Nov. 12, 2019

(65) Prior Publication Data

US 2021/0142454 A1 May 13, 2021

(51) Int. Cl.
*G06T 5/50* (2006.01)
*G06T 7/90* (2017.01)
*G06N 3/04* (2006.01)

(52) U.S. Cl.
CPC .............. *G06T 5/50* (2013.01); *G06N 3/04* (2013.01); *G06T 7/90* (2017.01); *G06T 2207/20081* (2013.01); *G06T 2207/20084* (2013.01)

(58) Field of Classification Search
CPC ... G06T 5/50; G06T 7/90; G06T 2207/20081; G06T 2207/20084; G06T 11/001; G06N 3/04; G06N 3/084; G06N 3/0454
See application file for complete search history.

(56) References Cited

U.S. PATENT DOCUMENTS

| | | | | |
|---|---|---|---|---|
| 6,556,691 | B1 * | 4/2003 | Lindmark | G06T 7/0012 |
| | | | | 382/100 |
| 10,535,164 | B2 * | 1/2020 | Shlens | G06N 3/04 |
| 10,657,676 | B1 * | 5/2020 | Rehfeld | G06N 3/0472 |
| 10,769,830 | B2 * | 9/2020 | Gehlaut | G06T 11/60 |
| 10,832,387 | B2 * | 11/2020 | Hu | G06T 5/005 |
| 10,872,399 | B2 * | 12/2020 | Li | G06N 3/088 |
| 10,929,392 | B1 * | 2/2021 | Cheng | G06F 16/242 |
| 10,950,021 | B2 * | 3/2021 | Dubey | G06N 5/022 |
| 2004/0037475 | A1 * | 2/2004 | Avinash | G06K 9/036 |
| | | | | 382/283 |
| 2011/0299776 | A1 * | 12/2011 | Lee | G06K 9/00234 |
| | | | | 382/173 |
| 2018/0068463 | A1 | 3/2018 | Risser | |
| 2018/0357800 | A1 * | 12/2018 | Oxholm | G06N 3/084 |
| 2019/0339371 | A1 * | 11/2019 | Dhatt | G01S 7/52084 |

(Continued)

OTHER PUBLICATIONS

Gatys et al., "Image Style Transfer Using Convolutional Neural Networks", 2016 IEEE Conference on Computing, 2016, 10 pages.

(Continued)

*Primary Examiner* — Xuemei G Chen
(74) *Attorney, Agent, or Firm* — Mueting Raasch Group (57) ABSTRACT

A silhouette image and a style image are input to a convolutional neural network to produce respective content feature layer and pattern feature layers. A reference image is input into the convolutional neural network to determine reference feature layers. For each of a plurality of iterations, a combination loss of the convolutional neural network is minimized to obtain an output image comprising an abstraction of the style image within confines of the silhouette image. The combination loss includes a content loss based on the content feature layers and a style loss based on the pattern feature layers.

18 Claims, 10 Drawing Sheets

(56) References Cited

U.S. PATENT DOCUMENTS

| | | | |
|---|---|---|---|
| 2019/0362522 A1* | 11/2019 | Han | A61B 5/7267 |
| 2019/0370936 A1* | 12/2019 | Zhang | G06T 3/4046 |
| 2020/0053257 A1* | 2/2020 | Sreepathihalli | H04N 5/2226 |
| 2020/0105029 A1* | 4/2020 | Jung | G06T 11/001 |
| 2020/0126584 A1* | 4/2020 | Huang | G10L 21/12 |
| 2020/0160494 A1* | 5/2020 | Hwang | G06N 3/08 |
| 2020/0202111 A1* | 6/2020 | Yuan | G06K 9/00288 |
| 2020/0202502 A1* | 6/2020 | Tsymbalenko | G06T 5/50 |
| 2020/0226724 A1* | 7/2020 | Fang | G06K 9/6232 |
| 2020/0258204 A1* | 8/2020 | Fang | G06T 3/0012 |
| 2020/0258273 A1* | 8/2020 | Chakrabarty | G06T 11/60 |
| 2020/0286273 A1* | 9/2020 | Chen | G06N 3/08 |
| 2020/0364838 A1* | 11/2020 | Liu | G06T 11/001 |
| 2020/0401877 A1* | 12/2020 | Alda | G06F 16/285 |
| 2021/0077063 A1* | 3/2021 | Swisher | G06T 11/00 |
| 2021/0110254 A1* | 4/2021 | Hoang | G06F 40/58 |
| 2021/0117736 A1* | 4/2021 | Merler | G06N 3/08 |

OTHER PUBLICATIONS

HP Smart Stream Designer, 2018, 4 pages.

Simonyan et al., "Very Deep Convolutional Networks for Large-Scale Image Recognition", ICLR, 2015. 14 pages.

Atarsaikhan et al., "Constrained Neural Style Transfer for Decorated Logo Generation", arXiv.org, Jul. 2018, 6 pages.

Michelucci, "Chapter 5: Cost Functions and Style Transfer" from "Advanced Applied Deep Learning: Convolutional Neural Networks and Object Detection", Sep. 29, 2019, pp. 161-193.

Extended European Search Report from EP Application No. 20204787.4 dated Mar. 25, 2021, 6 pages.

Harrington, "PARC/Intricate-Art-Neural-Transfer", retrieved from the internet on Jun. 23, 2021, 12 pages.

Ramea, "Creating Intricate Art with Neural Style Transfer", Becoming Human Magazine, Dec. 25, 2017, 13 pages.

* cited by examiner

FIG. 12 ns CONVOLUTIONAL NEURAL
NETWORK STYLE TRANSFER TO
AUTOMATE GRAPHIC DESIGN CREATION

SUMMARY

The present disclosure is directed to automated design generation for subtractive manufacturing utilizing accessibility constraint. In one embodiment, a silhouette image is input to a convolutional neural network to produce a content feature layer. A style image is input to the convolutional neural network to produce pattern feature layers. A reference image is input to the convolutional neural network to determine reference feature layers. For each of a plurality of iterations, a combination loss of the convolutional neural network is minimized to obtain an output image comprising an abstraction of the style image within confines of the silhouette image. The combination loss includes: a content loss between the content feature layer and corresponding one of the reference feature layers; and a style loss between the pattern feature layers and a corresponding set of the reference feature layers. The output image is utilized in a graphic design product.

In another embodiment, silhouette image and a style image are input to a convolutional neural network to respectively produce a content feature layer and pattern feature layers. The content feature layers and patter feature layers are combined in the convolutional neural network to obtain an output image comprising an abstraction of the style image within confines of the silhouette image. The combination is based on minimizing a content loss between the content feature layer and a corresponding reference feature layer and minimizing a style loss between the pattern feature layers and a corresponding set of other reference feature layers. The output image is utilized in a graphic design product.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures. The drawings are not necessarily to scale.

DETAILED DESCRIPTION

The present disclosure relates to automated graphic design creation. A system is described that uses an integrated procedural generation and neural style transfer algorithms to produce multiple unique graphic design patterns. The system takes in two kinds of input: a content picture and a style picture, and utilizes user-selected attributes to produce aesthetically pleasing design patterns. Currently, this kind of graphic design generation is created manually by artists using proprietary software such as Adobe Photoshop® or Adobe Illustrator®, and each artwork can take several hours to days to create. This system describe herein can produce similar artwork at scale within seconds. A prototype of this system has already been implemented.

Figure 1:
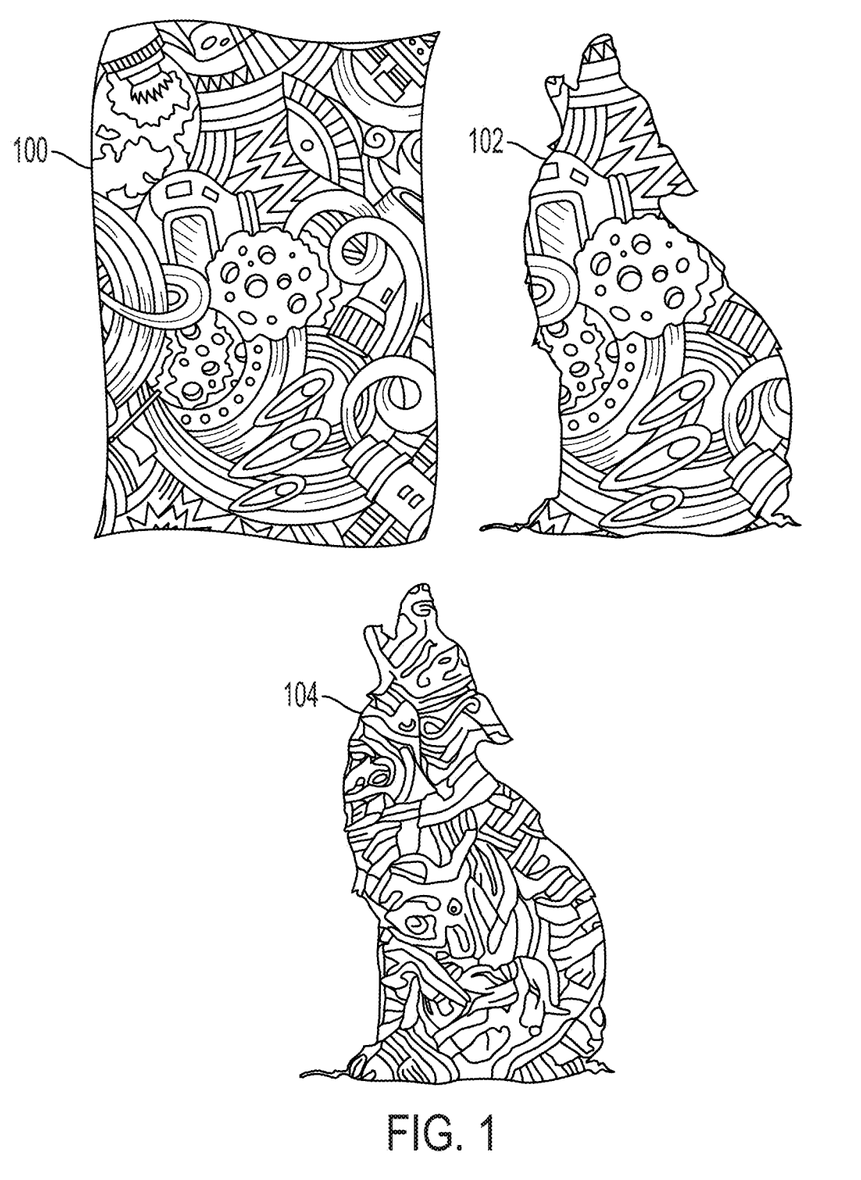
FIG. 1 is a set of images showing results of design generation according to an example embodiment.

Personalized designs are increasingly being preferred by companies to enhance the attractiveness of their products and logos. This requires generating unique patterns, which is typically done manually by graphic artists. This process takes considerable effort and time, and it is hard to produce quality output at scale. A few workarounds that exist commercially to increase the production speed include cutting an existing design into different shapes at random places of the pattern. Though this may produce unique output for users, the quality may not be aesthetically appealing, as this might lead to an "unfinished look." In FIG. 1 a set of images shows a pattern input 100 and an example of employing this simple "cut-out" 102 technique applied to a silhouette.

The system proposed herein not only produces unique patterns at scale but also improves the current generation techniques to create aesthetically pleasing artwork that fits and aligns within the given shape by utilizing the aspects of the neural style transfer algorithm. An example of this can be seen by image 104 in FIG. 1. The system can also be easily personalized as it has several user-defined parameters.

Figure 2:
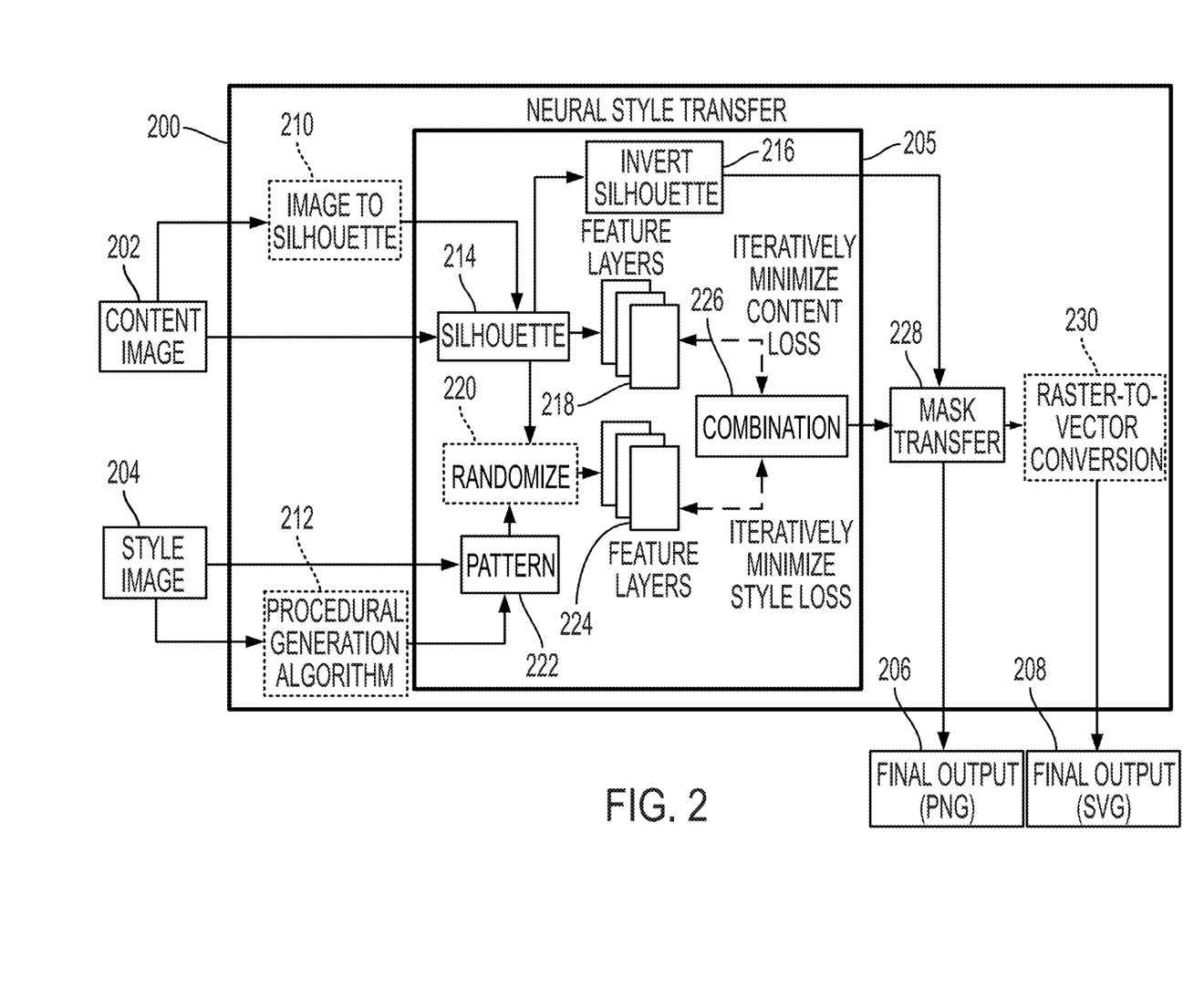
FIG. 2 is a block diagram showing a processing system according to an example embodiment.

The system includes several modules that facilitate the generation of graphic design patterns. In FIG. 2, a block diagram shows a system 200 according to an example embodiment. The system 200 takes two input images, a content image 202 and a style image 204. The content image 202 could be a silhouette and/or a picture from which a silhouette can be extracted, e.g., via image to silhouette convertor 210. The style image 204 could be a pattern, picture, or any other image that has some desirable stylistic properties. Optional image-to-silhouette 210 module and procedural generation 212 module can be selected if the input images are pictures (e.g., photographic images) instead of a silhouette and a pattern. These are input to a neural style transfer processor 205 that processes the input images 202, 204 to produce output images 206, 208.

Figure 3:
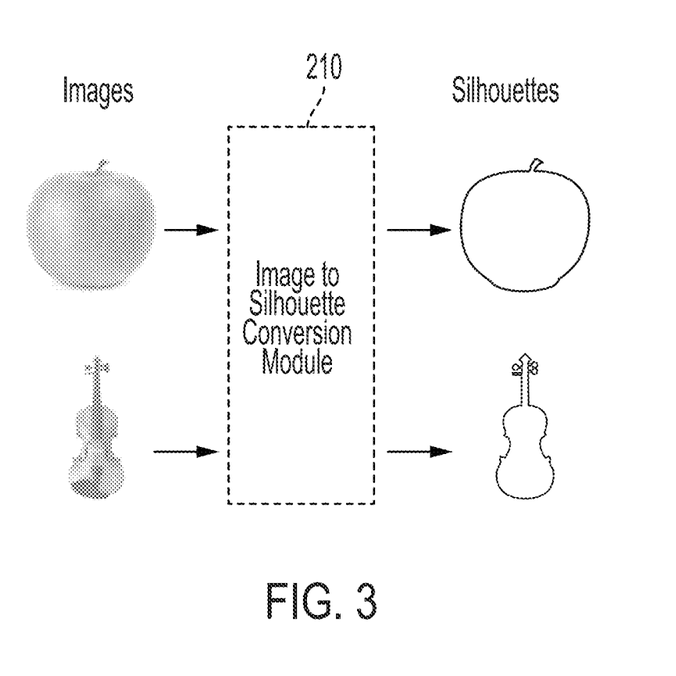
FIG. 3 is a diagram showing example inputs and outputs of a silhouette conversion module according to an example embodiment.

The system 200 is operable to fit unique patterns within a shape/outline, thus neural style transfer processor 205 takes a silhouette 214 as input, the silhouette being based on the content input image 202. Although users can provide silhouettes directly as a content image, the system also provides an option for users to give a picture as content. In this case, the image is first converted into a 'black and white' mode via module 210. A contour method is used to select thresholds in the 'near black' range (for example, color values less than 100 is used as the default threshold value) and solid black color is assigned for those, and solid white for the rest. The default threshold generally works for most images, but it can be adjusted if the user needs a higher or lower threshold for a specific image. Examples of the images provided by the silhouette module 210 according to an example embodiment are shown in FIG. 3.

Typically, the user provides a pattern to the system to use as a base to generate a new graphic design. In cases where the user does not have a pattern input, a procedural generation module 212 (see FIG. 2) can be used. Here, the user can give any picture as input and choose the procedural generation module to generate a unique pattern. Procedural generation technique is used in computer graphics to generate textures. In various embodiments, a specific symmetry generation technique may be used as described in "Creating Symmetry: The Artful Mathematics of Wallpaper Patterns," 2015, Princeton University Press by F. A. Farris. In this approach, a particular set of pixels is randomly chosen in a given picture to repeat symmetrically and generate wallpaper-like designs.

Figure 4:
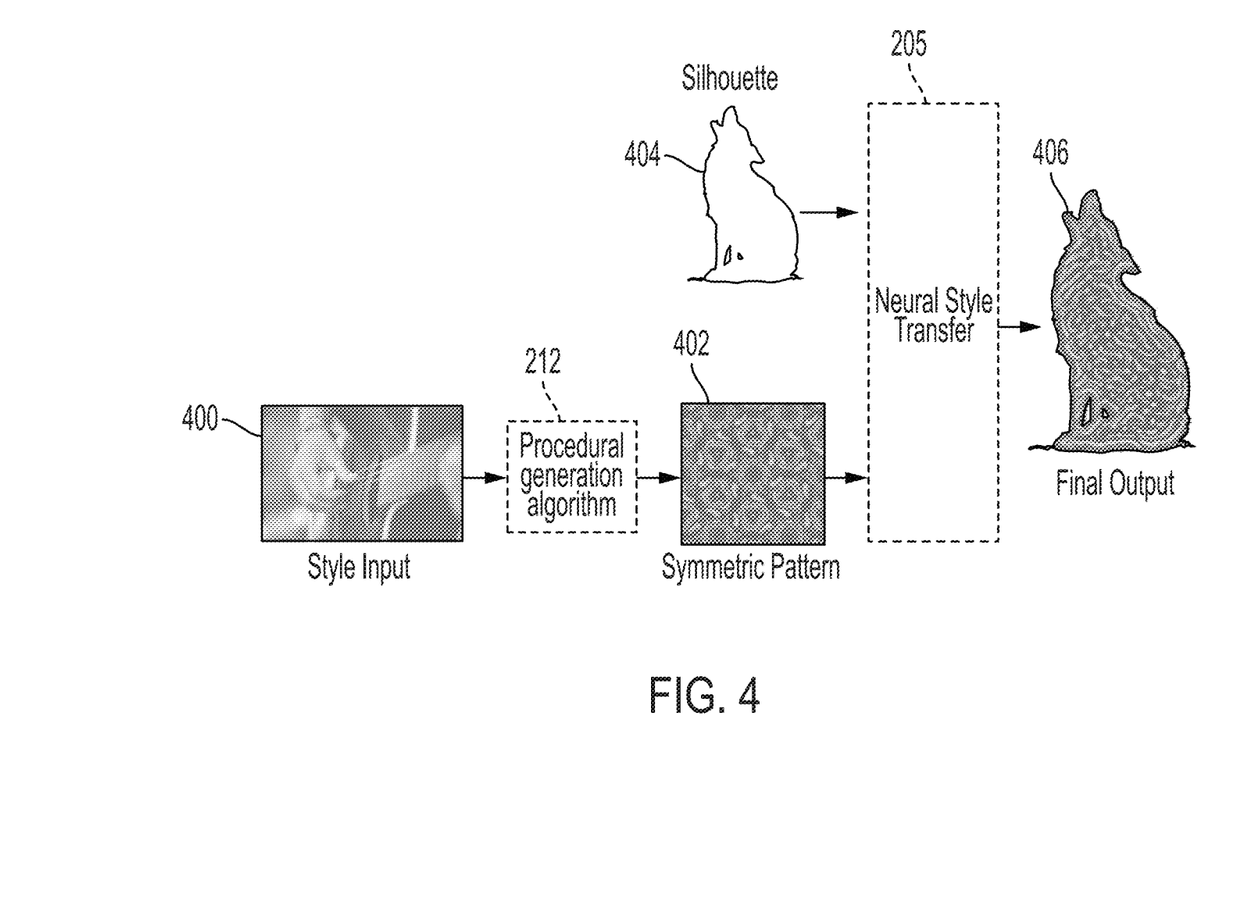
FIG. 4 is a diagram showing an output pattern generated via the procedural generation module according to an example embodiment.

In one embodiment, a hexagonal symmetric generation algorithm is used. This symmetric design acts as a "pattern" input when it goes into the neural processor 205. In FIG. 4, images show an artistic output pattern 402 generated via the procedural generation module 212 based on a seemingly simple picture 400, which is further used to produce a unique graphic design 406 as described in greater detail below.

In reference again to FIG. 2, the neural style transfer processor is based on an approach described in "Image Style Transfer Using Convolutional Neural Networks," Computer Vision and Pattern Recognition, 2016, by Gatys et al. (hereinafter Gatys), with modifications. First, the content and style images are passed through a deep convolutional neural network to obtain the feature layers 218, 224 for both the silhouette 214 and pattern 222. One example neural network that can be used for this purpose is referred to as VGGNet as described in "Very Deep Convolutional Networks for Large-Scale Image Recognition," International Conference on Learning Algorithms, 2015, by Simoyan et al.). The VGGNet network uses a stack of 19 filter layers (16 convolutional layers and three fully connected layers) and five pooling layers. Weights from a pre-trained neural network model are used for initializing the algorithm.

Figure 10:
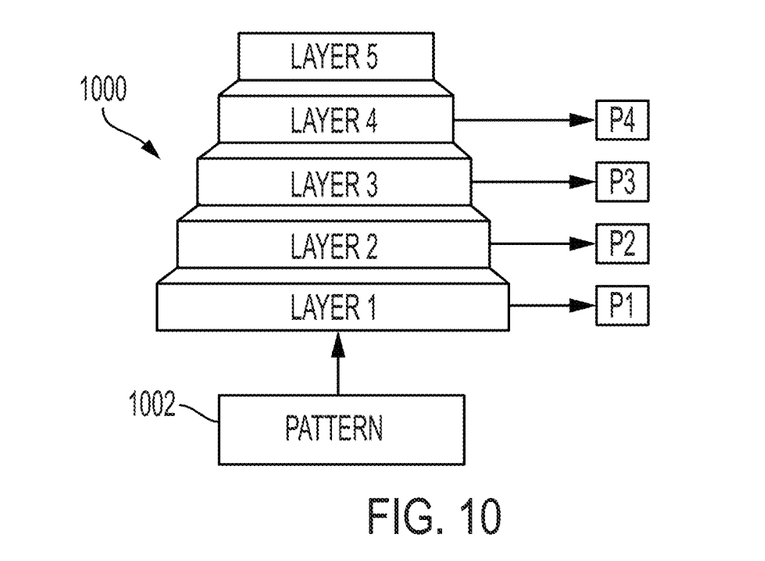
FIGS. 10-12 are block diagrams showing how neural style transfer may be performed according to an example embodiment.
Figure 11:
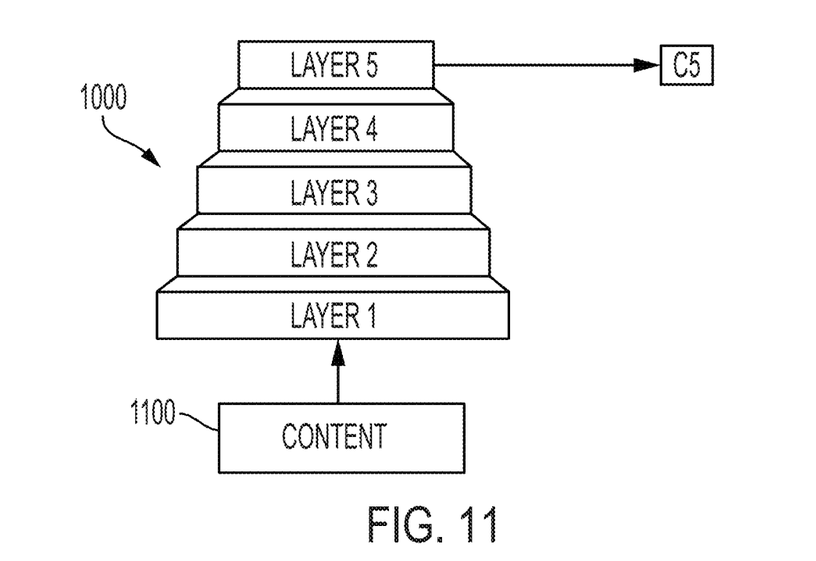
Figure 12:
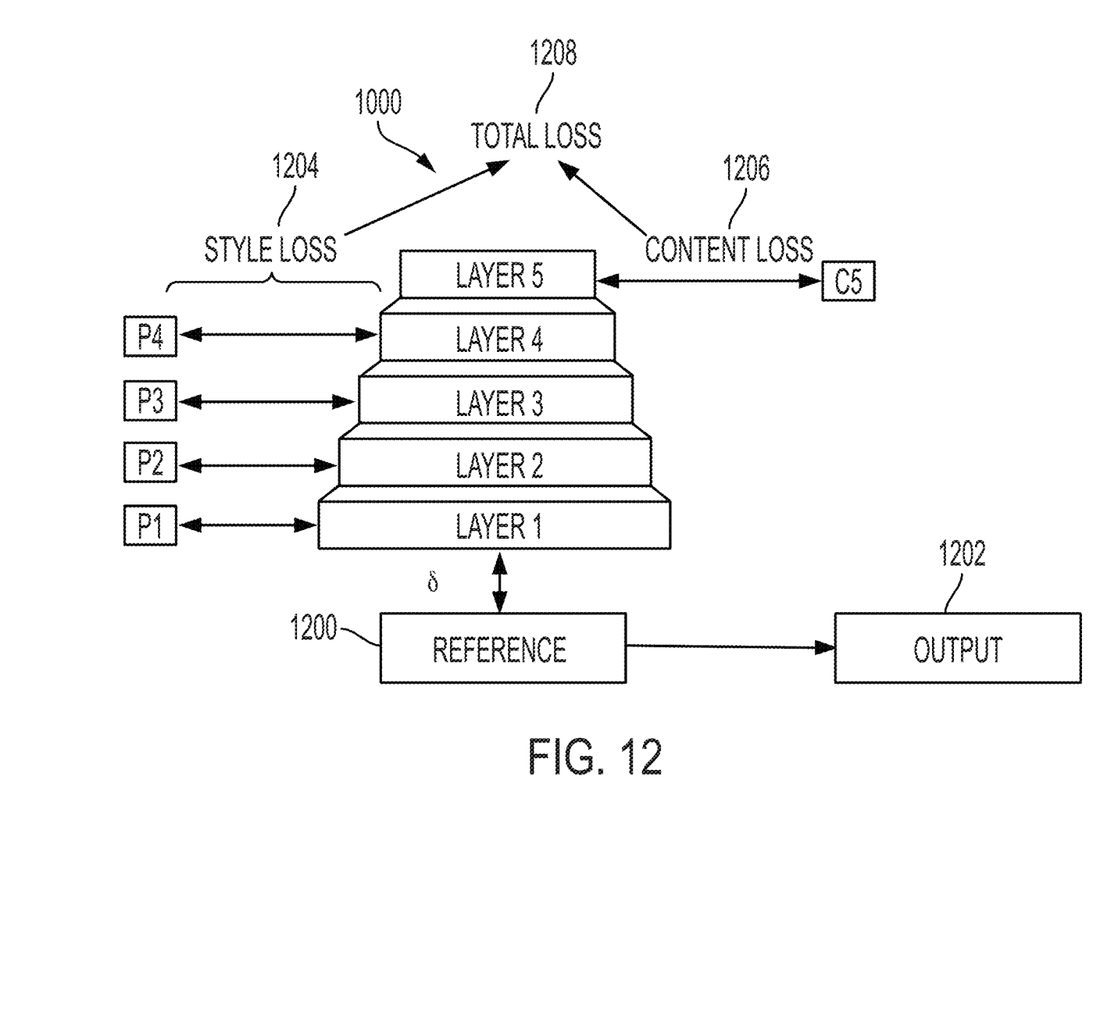

In FIGS. 10-12, block diagrams show how neural style transfer may be performed according to an example embodiment. To perform "style transfer" of one image to another, a neural network 1000 with sequential convolutional layers is initialized, typically, with pre-trained weights. Generally, the weights are obtained from neural network trained on photographic images (e.g., ImageNet pictures). The content and style features are then run through a neural network 1000, that has five convolutional layer blocks (LAYERS 1-5)—which include two or more convolutional layers, followed by a pooling function, and an activation function. As seen in FIG. 10, a pattern image 1002 is input to the neural network 1000 and one respective sublayer (P1-P4) of each layer is stored to represent the style. In other embodiments, more than one sublayer from each layer may be stored. As seen in FIG. 11, a single sublayer (C5) of the content representation is stored.

As seen in FIG. 12, a reference image 1200 (e.g., white noise image, one of the style or content images) is passed through the neural network 1000 and a style loss 1204 over multiple sublayers is calculated based on comparing (e.g., determining mean-squared difference between) the stored style sublayers P1-P5 and the corresponding layers of the neural network 1000 that result from processing the reference image. Similarly, a content loss 1206 is found by comparing the stored content layer with the corresponding layer of the neural network the result from processing the reference image. A combination of the style and content loss is used as a total loss 1208, and a derivative δ of the total loss can be found using error backpropagation. The derivative δ is used to iteratively update the reference image 1200 until its style and content features match that of the style and content images, thereby forming an output image 1202.

Unlike algorithms where artistic paintings are used as style image and photographic images are used as content, the illustrated system uses a silhouette as the content image and dense repeatable patterns as the style image. The illustrated system also differs in the way the combination image is prepared. For example, the highest-level convolutional feature layer (e.g., the fifth convolutional layer) is used for content, and a few selected lower level convolutional feature layers (that are determined through trial and error to speed up the process without compromising the artistic quality) are used for the style. A loss function called the Gram matrix (see Gatys) is defined to measure style loss and content loss, with respect to the original content and style images. This combined loss (e.g., a weighted combination of the style loss and content loss) is minimized at every iteration by using the gradient of the combined loss. The allowable value of the combined loss may be set to minimize iterations through the neural network.

In this system, two different algorithm variations may be presented to the user, which can be selected depending on the resolution and computation speed preferred by the user. These variations are based on the selection of feature layers and the number of iterations for loss minimization. One option is a regular style transfer, which includes all the sub-layers of lower level feature layers (layers one to four) for patterns, and the highest-level feature layer for content. This is slightly different from algorithms where all the five convolutional layers are utilized (e.g., Gatys). This is done to accommodate the lower level "patterns" to the boundaries of the silhouette. The combination loss is minimized for ten iterations. The approximate time taken for the design generation is around 45 seconds when using a NVIDIA 1080× GPU.

Another option is optimized style transfer. This alternative is chosen when the user needs a quick turnaround of the design generation. The feature layers include one sub-layer from each convolutional layer (layers one to four), and the algorithm is optimized for three iterations. The approximate time taken for the design generation using the optimized style transfer is around 15 seconds when using a NVIDIA 1080×GPU.

Figure 5:
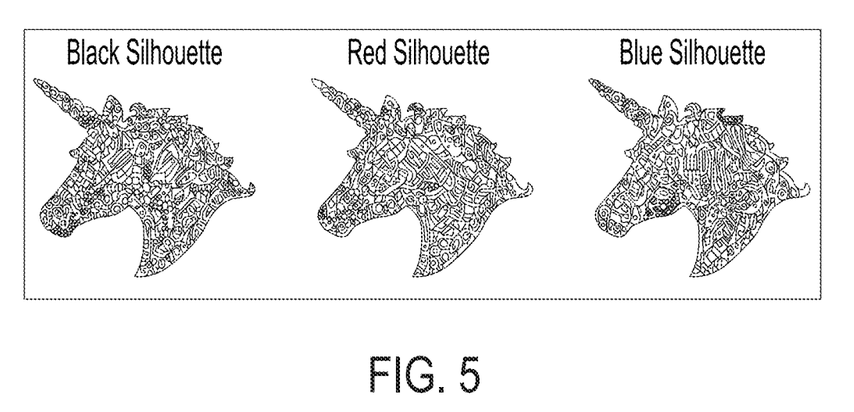
FIG. 5 is a set of images showing outputs of a randomization module based on different RGB values according to an example embodiment.

In reference again to FIG. 2, an optional randomize module 220 is used for producing variety in the generated graphic design. This can be used when the user wants to produce multiple graphic design patterns from the same content and style images. When this module 220 is chosen, the randomization happens in two ways. In one way, the silhouette color is randomly chosen on the RGB scale. As dark colors work well for silhouette style transfer, the color ranges in each RGB scale are chosen on the dark end of the spectrum. Different color choices produce a completely different set of fitted designs for the same input pattern, as shown in FIG. 5.

Figure 6:
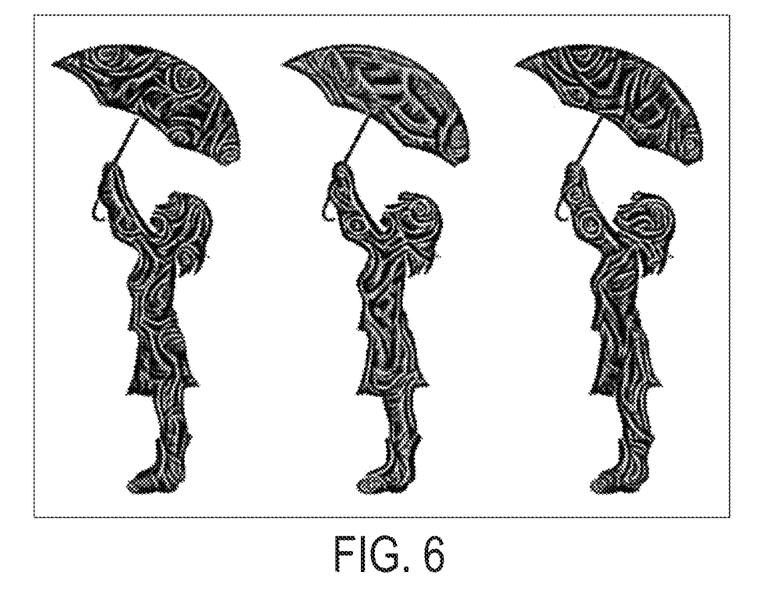
FIG. 6 is a set of images showing effects of using different image processing operations to randomize outputs according to an example embodiment.

Image processing operations, e.g., geometric transforms such as horizontal flip, vertical flip, transpose, etc., can be applied on the input pattern image before it goes into the neural style transfer processor 205. Other geometric transforms may include stretching, skewing/shearing, rounding, rotation, etc. This produces variations to the output as shown in FIG. 6. The randomize module does both the random selection of silhouette color and the image processing operations simultaneously, so the output produced by the algorithm each time is uniquely generated.

In reference again to FIG. 2, an invert silhouette module 216 is used to produce a mask for post-processing. The silhouette input 214, either generated from image to silhouette module or directly given by the user, is inverted in this module 228. This approach involves replacing the black color pixels with white and vice-versa. The resulting inverted silhouette is used in the mask transfer module 228 to clean up the generated image 226.

The mask transfer module 228 is used on the final generated image to produce a clean output. The neural style transfer approach, as described above, is used on the silhouette image 214. Although this approach works very well to align the patterns inside the edges of the silhouette 214, the algorithm also transfers patterns around the silhouette 214. These patterns appear faintly due to the white background around the silhouette and can spoil the aesthetic of the entire image. Therefore, a mask transfer using the inverted silhouette output (obtained from module 226) is applied to the generated image. Here, the inverted silhouette image is used as a filter to identify which patterns in the output can pass through at pixel level. For example, using a pixel by pixel comparison, patterns in the output image are selected only if the corresponding pixel is of solid white color in the inverted silhouette image. Otherwise, a solid white color is assigned to the pixel. This results in a graphic design output with a white background. The user can also choose a different color background in the mask transfer module if desired.

An optional raster-to-vector conversion module 230 can be useful for some graphic design applications. The neural style transfer algorithm works at a pixel level; therefore, the output is produced as a raster file. This may work well for digital distribution, but if the generated graphic design is to be printed in a large banner or brochure, the resolution produced by the algorithm may not be sufficient. In such cases, the raster-to-vector conversion module 230 converts a raster image to vector format. When this option is selected, the generated output goes through two processes simultaneously: color quantization and tracing.

Figure 7:
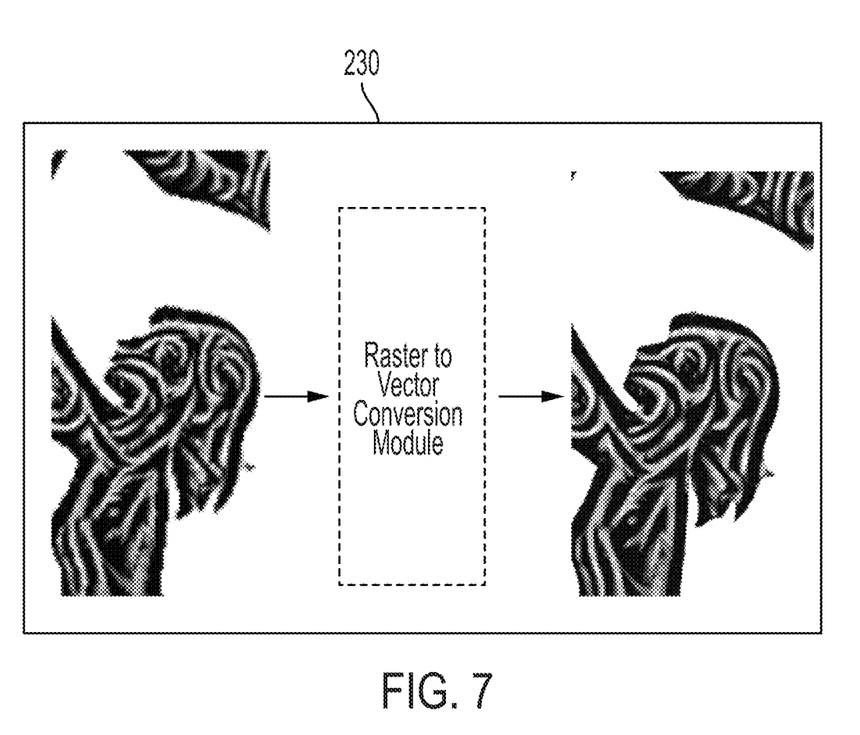
FIG. 7 is a diagram showing an example of raster-to-vector conversion according to an example embodiment.

The color quantization process quantifies the number of colors present in the image to a particular value. As default, the system uses 25 colors, and this can be modified by the user to increase or decrease the number of colors depending on the desired output. Software such as 'imagemagick' can be used for color quantization. Next, the image can be traced using a python package called 'potrace'. This is used for tracing the identifiable edges in the raster and transforms it into a vector image with smooth lines. The final output consists of stacked images produced from color quantization and tracing to produce a scalable vector image. The images in FIG. 7 show the increase in resolution of raster to vector output, which now has better defined and smooth edges and is ideal for printing.

Figure 8:
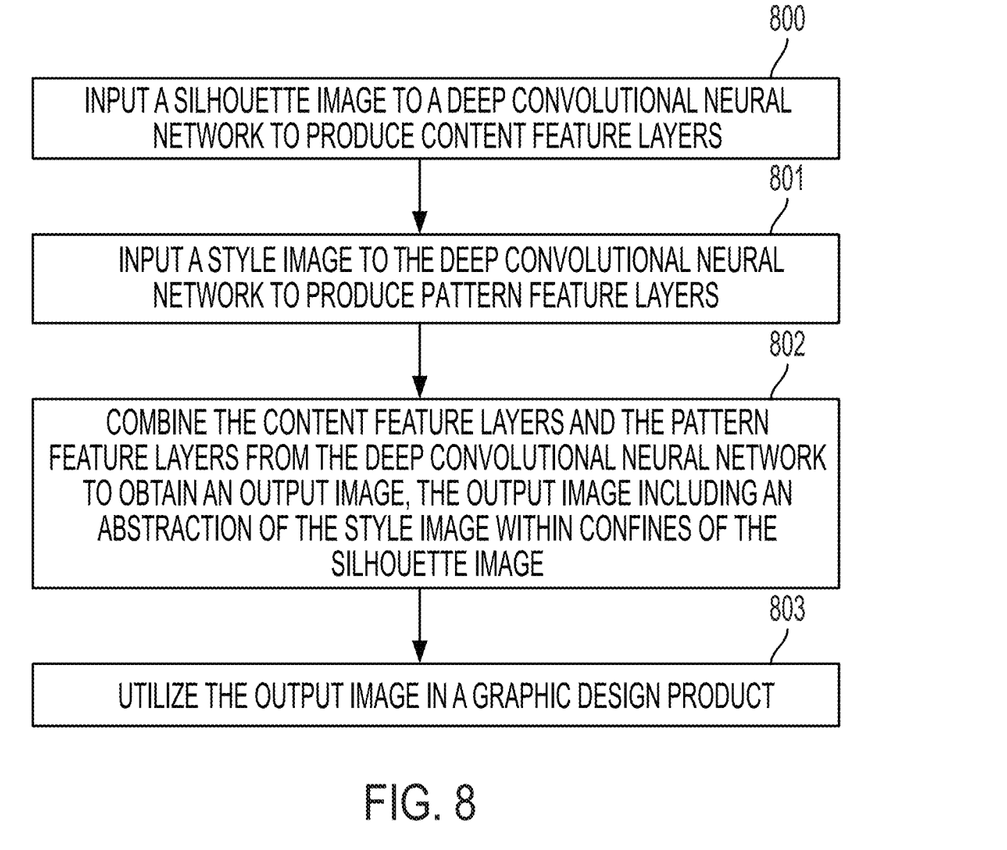
FIG. 8 is a flowchart of a method according to an example embodiment.

In FIG. 8, a flowchart shows a method according to an example embodiment. The method involves inputting 800 a silhouette image to a deep convolutional neural network to produce content feature layers. A style image is input 801 to the deep convolutional neural network to produce pattern feature layers. The content feature layers and the pattern feature layers from the deep convolutional neural network are combined 802 to obtain an output image. The output image includes an abstraction of the style image within confines of the silhouette image. The output image is utilized 803 in a graphic design product. For example, the output image may be used in a printed publication, decorative design on a product, electronic publication (e.g., web site, document file), three-dimensional sculpture, etc.

Figure 9:
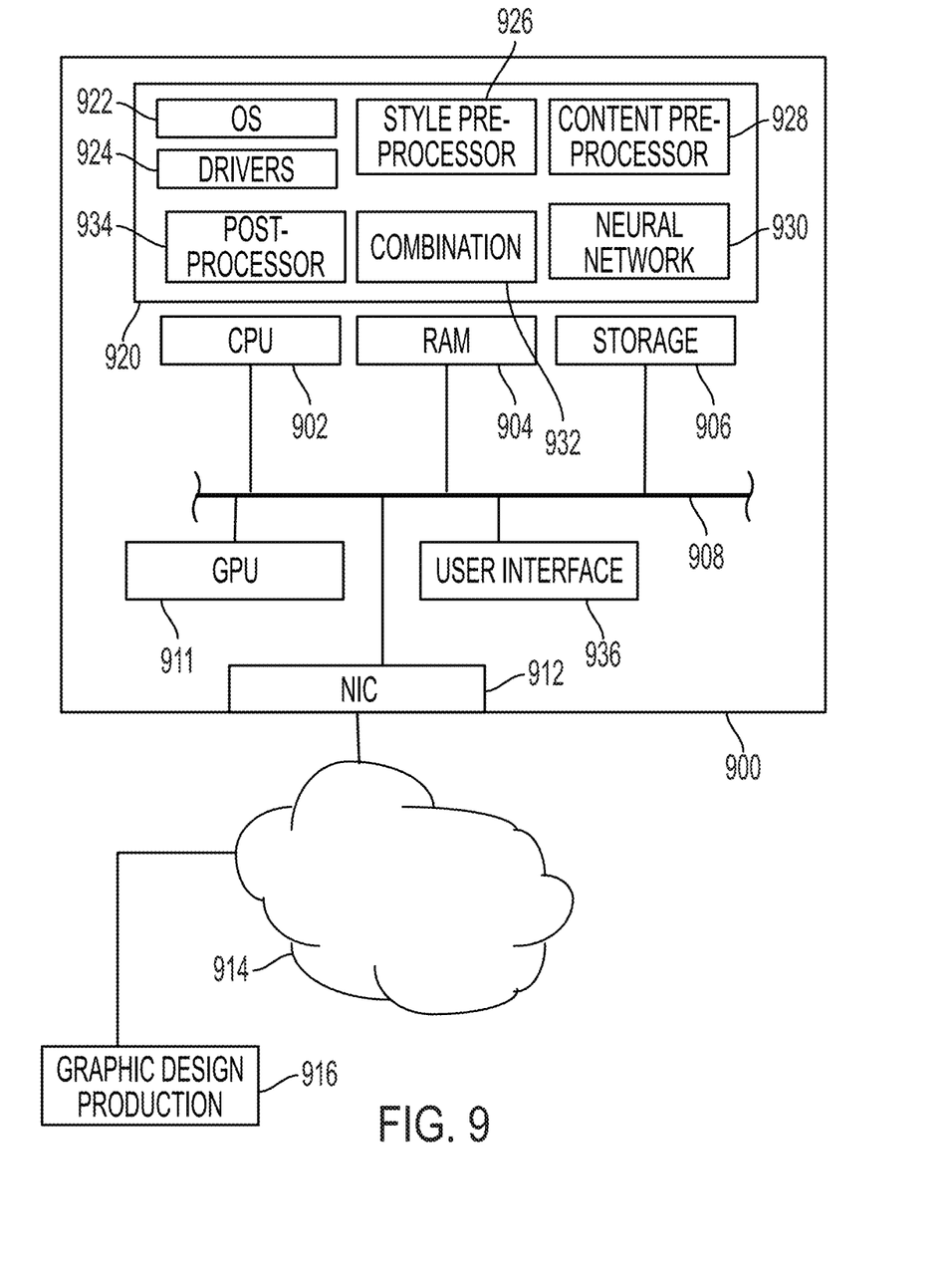
FIG. 9 is a block diagram of an apparatus according to an example embodiment.

The methods and processes described above can be implemented on computer hardware, e.g., workstations, servers, as known in the art. In FIG. 9, a block diagram shows an apparatus 900 that may be used to implement methods according to an example embodiment. The apparatus 900 includes one or more processors 902 such as a central processing unit, co-processor, digital signal processor, etc. The processor 902 is coupled to memory, which may include both random access memory 904 and persistent storage 906, via one or more input/output busses 908. Other general-purpose or special-purpose hardware may be coupled to the bus 908, such as graphics processing unit (GPU) 911 and network interface 912. Note that the functions of the apparatus 900 described below may be implemented via multiple devices, e.g., via client-server arrangement, clustered computing, cloud computing, etc.

The network interface 912 facilitates communications via a network 914 with a graphic design production system 916, using wired or wireless media. The graphic design production system 916 may produce physical media (e.g., printouts, three-dimensional objects) and electronic media (e.g., raster and/or vector files). In addition to producing media, the graphic design production system 916 may include pre-processors, formatters, user interfaces, etc., that prepare data for use by machines that are part of the system 916. Data may also be transferred to the graphic design production system 916 using non-network transport, e.g., via portable data storage drives, point-to-point communication, etc.

The apparatus 900 includes software 920 that facilitates automatically generating decorative graphics. The software 920 includes an operating system 922 and drivers 924 that facilitate communications between user-level programs and the hardware. The software 920 may also include a style pre-processor 926 that facilitates selection of style images (e.g., using text or visual search algorithms) and preparation of style images (e.g., procedural generation, randomization, etc.). A content pre-processor analysis module 928 facilitates selection of content images (e.g., using text or visual search algorithms) and preparation of content images (e.g., converting greyscale or color images to silhouette images). A neural network 930 (e.g., a deep, convolutional neural network) uses the silhouette image to produce content feature layers and uses the style image to produce pattern feature layers. The content feature layers and pattern feature layers can be stored in the memory 904 and or persistent storage 906.

A combination module 932 inputs a reference image to the neural network and compares the layer representations of the reference image with the stored style and content layers. A loss function is calculated based on this comparison and is used to adapt the neural network 930 through backpropagation to reduce the style and content loss in the reference image. This is repeated for a number of iterations until a stopping criterion is met (e.g., user-selected settings to emphasize speed or quality) at which point the reference image will represent an abstraction of the style image within confines of the silhouette image.

A post-processing module 934 can perform additional operations on the combination image. For example, the post-processing module 934 can invert the silhouette to mask the combination edges thereby providing sharper borders. The post-processing module 934 may also covert the combination image (which is a raster image) to a vector graphics format. Because the system may provide a number of user-selectable options, user interface hardware 936 may facilitate providing user inputs to the software 920, e.g., via a graphical user interface, command line instructions, configuration files, etc.

In summary, the system described above provides a way of generating graphic designs which not only saves time and manual effort but can also produce multiple, unique aesthetically pleasing artwork at scale. This architecture can use style transfer approaches have been used, e.g., for producing images that look like a painting, but used here to generate graphic designs using silhouette and mask transfer. A procedural generation algorithm is used in the context of deep neural style transfer. This allows the user to generate a unique artwork from a simple picture. Different algorithm variations allow the user to choose between fast design generation, e.g., producing graphic design patterns within seconds, or a higher-quality generation scheme that uses more iterations to reduce style and content loss. Randomization modules can be used to produce variety in the output images.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination and are not meant to be limiting, but purely illustrative. It is intended that the scope of the invention be limited not with this detailed description, but rather determined by the claims appended hereto.

The invention claimed is:

1. A method comprising:
inputting a silhouette image to a convolutional neural network to produce a content feature layer;
receiving a user selection between two different style options, a first option utilizing all sublayers of lower layers of the convolutional neural network for pattern feature layers and performing more than five iterations, the second option utilizing only one sublayer of each lower layer of the convolutional neural network for the pattern feature layers and performing five or fewer iterations;
inputting a style image to the convolutional neural network to produce the pattern feature layers according to the user selection;
inputting a reference image into the convolutional neural network to determine reference feature layers, and for each of a plurality of iterations, minimizing a combination loss of the convolutional neural network to obtain an output image comprising an abstraction of the style image within confines of the silhouette image, the combination loss comprising:
a content loss between the content feature layer and corresponding one of the reference feature layers; and
a style loss between the pattern feature layers and a corresponding set of the reference feature layers; and
utilizing the output image in a graphic design product.

2. The method of claim 1, wherein the content feature layers are taken from a highest-level layer of the convolutional neural network.

3. The method of claim 1, wherein the pattern feature layers are taken from lowest layers of the convolutional neural network.

4. The method of claim 1, further comprising pre-processing the style image using procedural generation to produce one or more patterns that are input to the convolutional neural network.

5. The method of claim 1, further comprising varying the abstraction of the style image in multiple, different, output images by performing one or more of:
randomly varying a color of the silhouette; and
applying random geometric transforms to the style image.

6. The method of claim 1, further comprising converting an input content image to the silhouette image based on a threshold color value of the input content image.

7. The method of claim 1, further comprising masking the output image with an inverse of the silhouette image.

8. The method of claim 1, further comprising converting the output image from a raster image to a vector image.

9. The method of claim 1, wherein the convolutional neural network is initialized with weights from a pre-trained neural network model.

10. A system comprising:
an apparatus comprising a processor and a memory, the processor operable via instructions to:
process a silhouette image through a convolutional neural network to produce a content feature layer and store the content feature layer in a memory;
receive a user selection between two different style options, a first option utilizing all sublayers of lower layers of the convolutional neural network for pattern feature layers and performing more than five iterations, the second option utilizing only one sublayer of each lower layer of the convolutional neural network for the pattern feature layers and performing five or fewer iterations;
process a style image through the convolutional neural network to produce the pattern feature layers according to the user selection and store the pattern feature layer in the memory;
process a reference image through the convolutional neural network to determine reference feature layers; and
for each of a plurality of iterations, minimize a combination loss of the convolutional neural network to obtain an output image comprising an abstraction of the style image within confines of the silhouette image, the combination loss comprising: a content loss between the content feature layer and corresponding one of the reference feature layers; and a style loss between the pattern feature layers and a corresponding set of the reference feature layers.

11. The system of claim 10, wherein the content feature layers are taken from a highest-level layer of the convolutional neural network and the pattern feature layers are taken from lowest layers of the convolutional neural network.

12. The system of claim 10, wherein the processor is further operable to pre-process the style image through a procedural generational module to produce one or more patterns that are input to the convolutional neural network.

13. The system of claim 10, wherein the processor is further operable to vary the abstraction of the style image in multiple, different, output images by performing one or more of:

randomly varying a color of the silhouette; and applying random geometric transforms to the style image.

14. The system of claim 10, wherein the processor is further operable to convert an input content image to the silhouette image based on a threshold color value of the input content image.

15. The system of claim 10, wherein the convolutional neural network is initialized with weights from a pre-trained neural network model.

16. A method comprising:

inputting a silhouette image and a style image to a convolutional neural network to respectively produce a content feature layer and pattern feature layers;

receiving a user selection between two different style options, a first option utilizing all sublayers of lower layers of the convolutional neural network for pattern feature layers and performing more than five iterations, the second option utilizing only one sublayer of each lower layer of the convolutional neural network for the pattern feature layers and performing five or fewer iterations, the pattern feature layers being produced based on the user selection;

combining the content feature layers and the pattern feature layers from the convolutional neural network to obtain an output image, the combination being based on minimizing a content loss between the content feature layer and a corresponding reference feature layer and minimizing a style loss between the pattern feature layers and a corresponding set of other reference feature layers, the output image including an abstraction of the style image within confines of the silhouette image; and utilizing the output image in a graphic design product.

17. The method of claim 16, wherein the content feature layers are taken from a highest-level layer of the convolutional neural network.

18. The method of claim 16, wherein the pattern feature layers are taken from lowest layers of the convolutional neural network.

* * * * *